United States Patent
Yang et al.

(10) Patent No.: US 7,542,523 B2
(45) Date of Patent: *Jun. 2, 2009

(54) PIPELINE ARCHITECTURE FOR MULTI-SLOT WIRELESS LINK PROCESSING

(75) Inventors: Baoguo Yang, Iselin, NJ (US); Li Fung Chang, Holmdel, NJ (US); Zhijun Gong, Iselin, NJ (US)

(73) Assignee: Broadcom Corporation, Irvine, CA (US)

( * ) Notice: Subject to any disclaimer, the term of this patent is extended or adjusted under 35 U.S.C. 154(b) by 430 days.

This patent is subject to a terminal disclaimer.

(21) Appl. No.: 11/265,021

(22) Filed: Nov. 2, 2005

(65) Prior Publication Data

US 2006/0050816 A1    Mar. 9, 2006

Related U.S. Application Data

(63) Continuation of application No. 10/731,858, filed on Dec. 9, 2003, now Pat. No. 7,027,539.

(60) Provisional application No. 60/431,940, filed on Dec. 9, 2002, provisional application No. 60/478,922, filed on Jun. 16, 2003.

(51) Int. Cl.
    *H03K 9/00* (2006.01)
(52) U.S. Cl. .................. 375/316; 375/229; 375/350; 375/346; 455/307; 708/300
(58) Field of Classification Search ............... 375/316, 375/229, 350, 346; 455/307; 708/300
    See application file for complete search history.

(56) References Cited

U.S. PATENT DOCUMENTS 4,745,622 A * 5/1988 Gupta ................... 375/232

(Continued)

FOREIGN PATENT DOCUMENTS

EP    0 671 817 A    9/1995

(Continued)

OTHER PUBLICATIONS

Jonghoon Ann, "Performance evaluation and comparison of pre-equalizer for rain attenuation channels in a B-WLL uplink system", Proceedings VTC 2002 Fall 2002 IEEE 56th Vehicular Technology Conference, 2002. vol. 4, Sep. 24-28, 2002 pp. 2489-2492 vol. 4.*

(Continued)

*Primary Examiner*—Juan A Torres
(74) *Attorney, Agent, or Firm*—Garlick Harrison & Markison; Bruce E. Garlick

(57) ABSTRACT

A wireless communication device processes N Radio Frequency (RF) bursts contained within N slots of a digital communications time divided frame, wherein N is a positive integer greater than one. The wireless communication device includes an RF front end, a baseband processor, and an equalizer module. The RF front end is operable to receive the plurality of received RF bursts and to convert the RF bursts to corresponding baseband signals. The baseband is operable to receive the baseband signals, to pre-equalization process the baseband signals to produce processed baseband signals, and to post-equalization process soft decisions. The equalizer module is operable to equalize the processed baseband signals to produce the soft decisions. These RF bursts may be contained in adjacent slots or, in non-adjacent slots, or in a combination of adjacent slots and non-adjacent slots.

32 Claims, 9 Drawing Sheets

U.S. PATENT DOCUMENTS

| | | | |
|---|---|---|---|
| 5,600,673 A * | 2/1997 | Kimura et al. | 375/224 |
| 6,456,598 B1 | 9/2002 | Le Strat | |
| 6,463,107 B1 * | 10/2002 | Lindoff et al. | 375/343 |
| 6,539,205 B1 | 3/2003 | Wan | |
| 6,904,110 B2 * | 6/2005 | Trans et al. | 375/350 |
| 2002/0181615 A1 * | 12/2002 | Kuzminskiy et al. | 375/316 |
| 2002/0186761 A1 | 12/2002 | Corbaton | |
| 2002/0196844 A1 * | 12/2002 | Rafie et al. | 375/232 |
| 2003/0053535 A1 * | 3/2003 | Malkov et al. | 375/233 |
| 2004/0097207 A1 * | 5/2004 | Sandaralingam | 455/205 |
| 2005/0084040 A1 * | 4/2005 | Stewart et al. | 375/324 |

FOREIGN PATENT DOCUMENTS

| | | |
|---|---|---|
| EP | 1 033 852 A1 | 2/1999 |
| EP | 1 176 750 A | 1/2002 |
| GB | 2 341 296 A | 3/2000 |
| WO | WO 00/69023 | 11/2000 |
| WO | WO 01/33792 A1 | 5/2001 |
| WO | WO 02/071608 A1 | 9/2002 |

OTHER PUBLICATIONS

Coersmeier, "Adaptive pre-equalization in analog heterodyne architectures for wireless LAN", Radio and Wireless Conference, 2002. Rawcon 2002, IEEE, Aug. 11-14, 2002 pp. 107-110.*

Kuzminskiy, "Comparison of linear and MLSE spatio-temporal interference rejection combining with an antenna array in a GSM system", 2000 IEEE 51st, Vehicular Technology Conference Proceedings, 2000, VTC 2000-Spring Tokyo, vol. 1, May 15-18, 2000 pp. 172-176 vol. 1.*

Qian, "Space diversity reception and parallel blind equalization in short-burst TDMA systems", IEEE Transactions on Vehicular Technology, vol. 51, Issue 1, Jan. 2002 pp. 122-129.*

Rohani, "Low cost high performance CDMA system for US PCS", Universal 1st International Conference on Personal Communications, 1992. ICUPC '92 Proceedings, Sep. 29-Oct. 1, 1992 pp. 10.05/1-10.05/5.*

Giridhar, "Adaptive MAPSD algorithms for symbol and timing recovery of mobile radio TDMA signals", IEEE Transactions on Communications, vol. 44, Issue 8, Aug. 1997 pp. 976-987.*

* cited by examiner

PIPELINE ARCHITECTURE FOR MULTI-SLOT WIRELESS LINK PROCESSING

CROSS REFERENCES TO RELATED APPLICATIONS

This application is a continuation of U.S. Utility patent application Ser. No. 10/731,858 filed Dec. 9, 2003, now issued as U.S. Utility Pat. No. 7,027,539 B2, which claims priority to U.S. Provisional Patent Application Ser. No. 60/431,940, filed Dec. 9, 2002, and to U.S. Provisional Patent Application Ser. No. 60/478,922, filed Jun. 16, 2003, all of which are incorporated herein by reference for all purposes.

BACKGROUND

1. Technical Field

The present invention relates generally to cellular wireless communication systems; and more particularly to the processing of data communications received by a wireless terminal in such a cellular wireless communication system.

2. Related Art

Cellular wireless communication systems support wireless communication services in many populated areas of the world. While cellular wireless communication systems were initially constructed to service voice communications, they are now called upon to support data communications as well. The demand for data communication services has exploded with the acceptance and widespread use of the Internet. While data communications have historically been serviced via wired connections, cellular wireless users now demand that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless communication system data communications will only increase with time. Thus, cellular wireless communication systems are currently being created/modified to service these burgeoning data communication demands.

Cellular wireless networks include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its cell/sectors. A BSC coupled to the base station routes voice communications between the MSC and a serving base station. The MSC routes voice communications to another MSC or to the Public Switched Telephone Network (PSTN). Typically, BSCs route data communications between a servicing base station and a packet data network that may include or couple to the Internet. Transmissions from base stations to wireless terminals are referred to as "forward link" transmissions while transmissions from wireless terminals to base stations are referred to as "reverse link" transmissions. The volume of data transmitted on the forward link typically exceeds the volume of data transmitted on the reverse link. Such is the case because data users typically issue commands to request data from data sources, e.g., web servers, and the web servers provide the data to the wireless terminals.

Wireless links between base stations and their serviced wireless terminals typically operate according to one (or more) of a plurality of operating standards. These operating standards define the manner in which the wireless link may be allocated, setup, serviced and torn down. One popular cellular standard is the Global System for Mobile telecommunications. (GSM) standard. The GSM standard, or simply GSM, is predominant in Europe and is in use around the globe. While GSM originally serviced only voice communications, it has been modified to also service data communications. GSM General Packet Radio Service (GPRS) operations and the Enhanced Data rates for GSM (or Global) Evolution (EDGE) operations coexist with GSM by sharing the channel bandwidth, slot structure, and slot timing of the GSM standard. GPRS operations and EDGE operations may also serve as migration paths for other standards as well, e.g., IS-136 and Pacific Digital Cellular (PDC).

In order for EDGE to provide increased data rates within a 200 KHz GSM channel, it employs a higher order modulation, 8-PSK (octal phase shift keying), in addition to GSM's standard Gaussian Minimum Shift Keying (GMSK) modulation. EDGE allows for nine different (autonomously and rapidly selectable) air interface formats, known as Modulation and Coding schemes (MCSs), with varying degrees of error control protection. Low MCS modes, (MCS 1-4) use GMSK (low data rate) while high MCS modes (MCS 5-9) use 8-PSK (high data rate) modulation for over the air transmissions, depending upon the instantaneous demands of the application and the operating conditions.

EDGE uses the higher order 8-PSK and the GMSK modulations and a family of MCSs or each GSM radio channel time slot, so that each user connection may adaptively determine the best MCS setting for the particular radio propagation conditions and data access requirements of the user. In addition, the "best" air interface mode is enhanced with a technique called incremental redundancy (IR), whereby packets are transmitted first with initially selected MCS mode and puncturing, and then subsequent packets are transmitted with additional redundancy using differing puncturing patterns and potentially different MCS modes within a common MCS family. Rapid feedback between the base station and wireless terminal may restore the previous acceptable air interface state, which is presumably at an acceptable level but with minimum required coding and with minimum bandwidth and power drain.

The GSM standard specifies communications in a time divided format (in multiple channels). The GSM standard specifies a 20 ms frame that is divided into four sub-frames, each including eight slots of approximately 625 μs in duration. Each slot corresponds to a Radio Frequency (RF) burst having a left side, a midamble, and a right side.

A wireless terminal operating within a GSM system may require significant forward link (and/or reverse link) throughput during any given time period(s). To satisfy the forward link throughput requirements, the GSM network may allocate multiple forward link time slots to the wireless terminal. So that reverse link transmissions may be serviced in other of the slots, assigned slots that carry forward link transmissions are often adjacent one another, e.g., two or more time adjacent slots. The assignment of adjacent slots for forward link transmissions allows the wireless terminal to switch between transmit and receive operations within a single GSM frame/sub-frame.

Conventional wireless terminals have difficulty in receiving and processing RF bursts in adjacent slots and also meeting their other requirements. Thus, there exists a need for a wireless terminal that can receive and process multiple RF bursts while meeting the other requirements of the wireless terminal.

BRIEF SUMMARY OF THE INVENTION

In order to overcome these shortcomings of the prior devices, among others, a wireless communication device processes N Radio Frequency (RF) bursts contained within N slots of a digital communications time divided frame, wherein N is a positive integer greater than one. The wireless communication device includes an RF front end, a baseband processor, and an equalizer module. The RF front end is operable to receive the plurality of received RF bursts and to convert the RF bursts to corresponding baseband signals. The baseband processor operably couples to the RF front end, is operable to receive the baseband signals, is operable to pre-equalization process the baseband signals to produce processed baseband signals, and is operable to post-equalization process soft decisions. The equalizer module operably couples to the baseband processor and is operable to equalize the processed baseband signals to produce the soft decisions.

According to the present invention, the baseband processor and the equalizer module are operable as a pipeline. With these pipeline operations, for at least one of the N RF bursts, the baseband processor performs pre-equalization processing of a corresponding baseband signal to produce a processed baseband signal while the equalizer module concurrently equalizes a processed baseband signal corresponding to a prior RF burst to produce soft decisions. According to another aspect of these pipeline operations, for at least one of the N RF bursts, the baseband processor performs post-equalization processing of soft decisions corresponding to a prior RF burst while concurrently equalizing a processed baseband signal corresponding to the RF burst. These RF bursts may be contained in adjacent slots or, in non-adjacent slots, or in a combination of adjacent slots and non-adjacent slots.

Other features and advantages of the present invention will become apparent from the following detailed description of the invention made with reference to the accompanying drawings.

Figure 7:
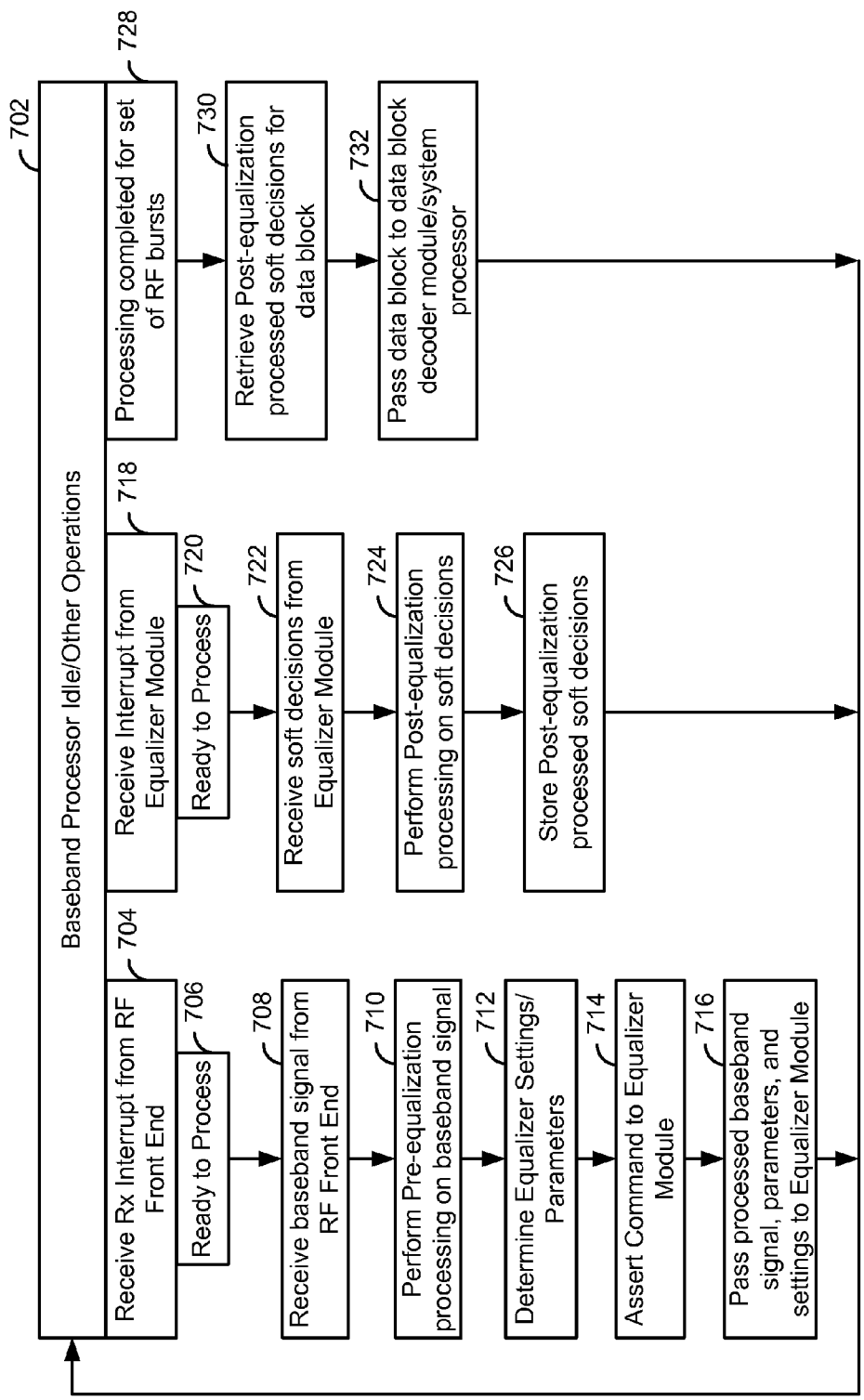
Figure 8:
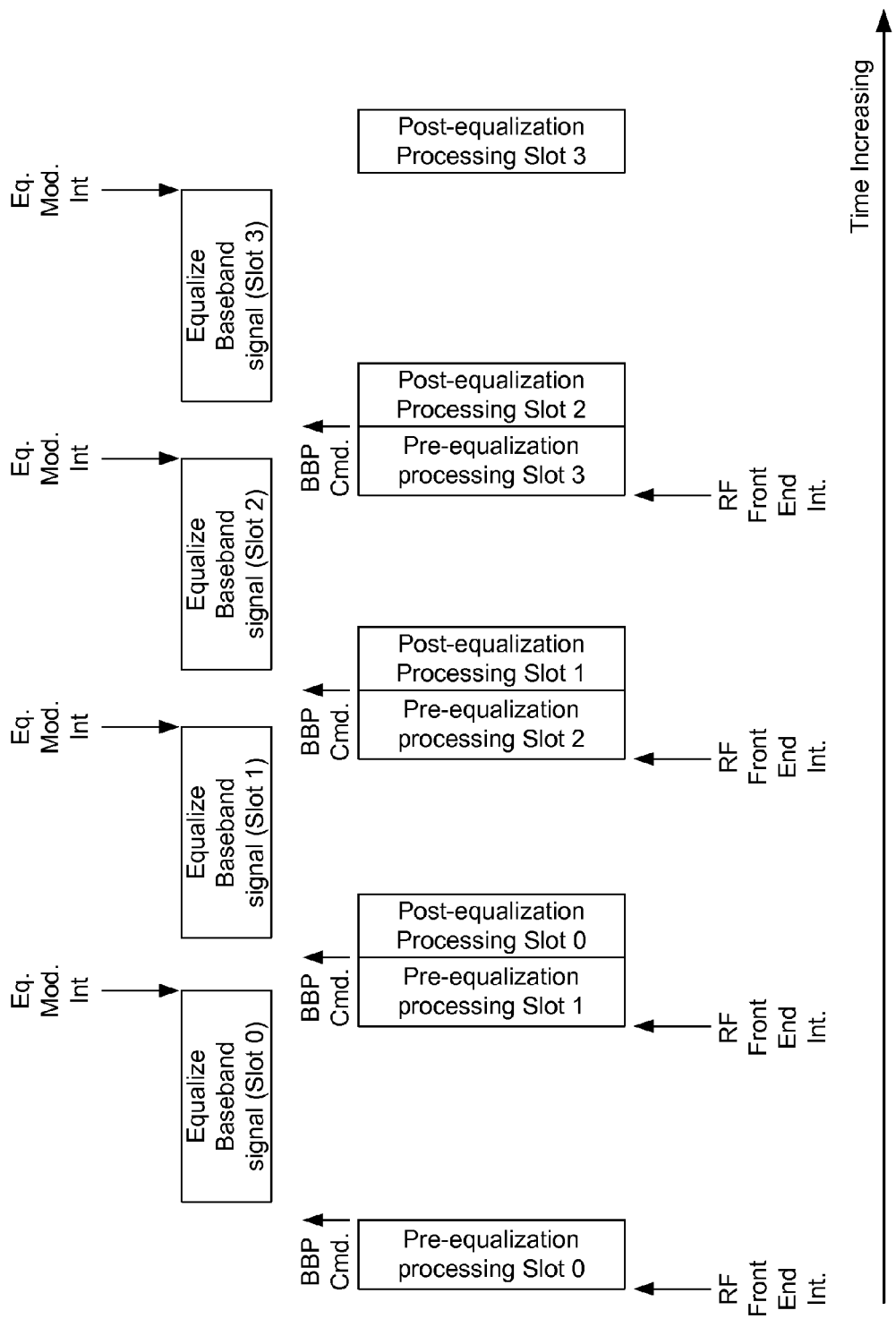

FGS. 6A and 6B are flow charts illustrating operation of a wireless terminal in receiving and processing a RF burst;

FIG. 7 is a flow chart illustrating operations of the baseband processor according to an embodiment of the present invention; and FIG. 8 is a block diagram illustrating pipeline processing operations performed according to the present invention.

DETAILED DESCRIPTION OF THE DRAWINGS

Figure 1:
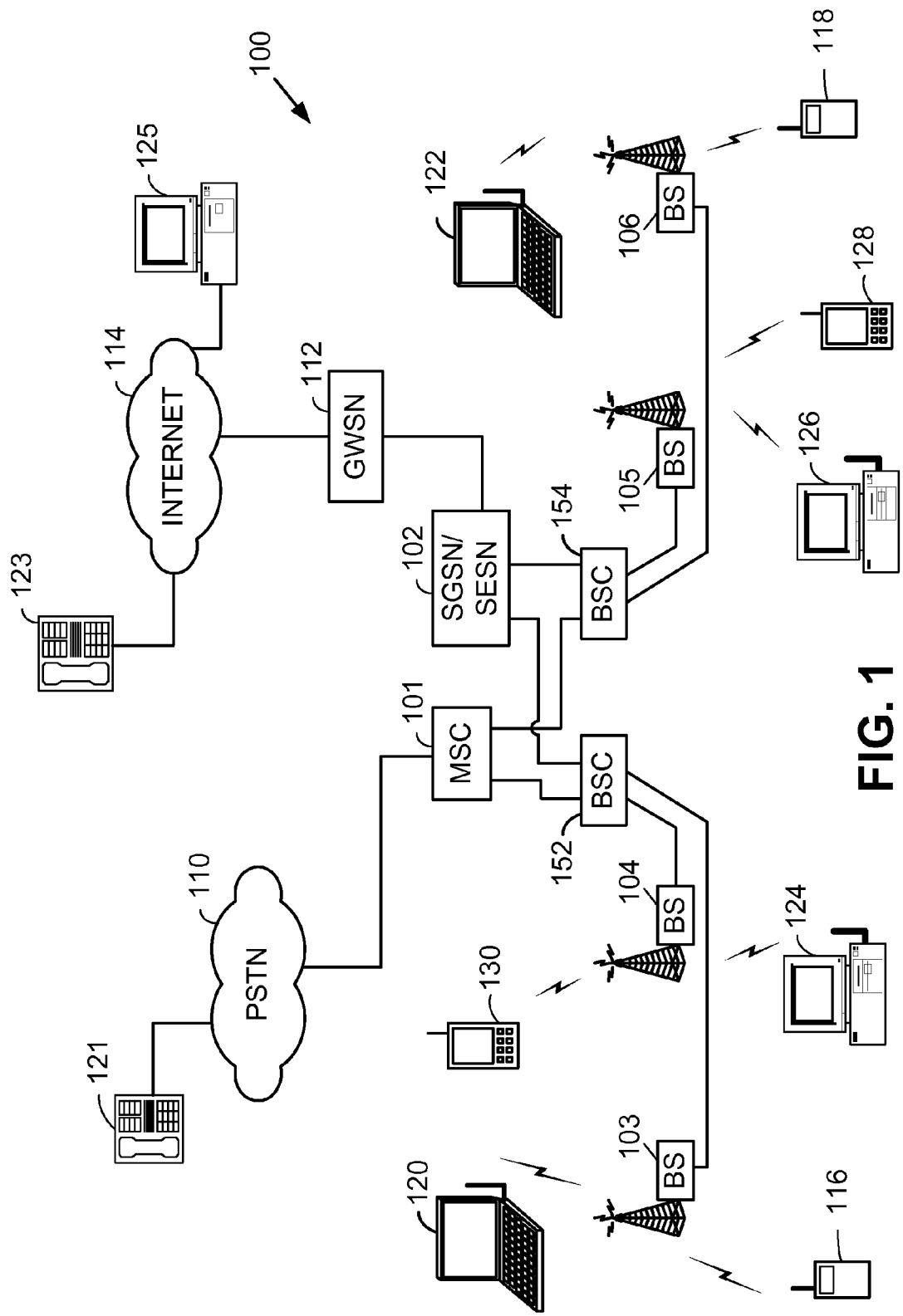
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating according to the present invention. The cellular wireless communication system 100 includes a Mobile Switching Center (MSC) 101, Serving GPRS Support Node/Serving EDGE Support Node (SGSN/SESN) 102, base station controllers (BSCs) 152 and 154, and base stations 103, 104, 105, and 106. The SGSN/SESN 102 couples to the Internet 114 via a GPRS Gateway Support Node (GGSN) 112. A conventional voice terminal 121 couples to the PSTN 110. A Voice over Internet Protocol (VoIP) terminal 123 and a personal computer 125 couple to the Internet 114. The MSC 101 couples to the Public Switched Telephone Network (PSTN) 110.

Each of the base stations 103-106 services a cell/set of sectors within which it supports wireless communications. Wireless links that include both forward link components and reverse link components support wireless communications between the base stations and their serviced wireless terminals. These wireless links support digital data communications, VoIP communications, and other digital multimedia communications. The cellular wireless communication system 100 may also be backward compatible in supporting analog operations as well. The cellular wireless communication system 100 supports the Global System for Mobile telecommunications (GSM) standard and also the Enhanced Data rates for GSM (or Global) Evolution (EDGE) extension thereof. The cellular wireless communication system 100 may also support the GSM General Packet Radio Service (GPRS) extension to GSM. However, the present invention is also applicable to other standards as well, e.g., TDMA standards, CDMA standards, etc. In general, the teachings of the present invention apply to digital communications that combine Automatic Repeat ReQuest (ARQ) operations at Layer 2, e.g., LINK/MAC layer with variable coding/decoding operations at Layer 1 (PHY).

Wireless terminals 116, 118, 120, 122, 124, 126, 128, and 130 couple to the cellular wireless communication system 100 via wireless links with the base stations 103-106. As illustrated, wireless terminals may include cellular telephones 116 and 118, laptop computers 120 and 122, desktop computers 124 and 126, and data terminals 128 and 130. However, the cellular wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate requirements while the upload data-rate requirements are not as severe. Some or all of the wireless terminals 116, 118, 120, 122, 124, 126, 128, and 130 are therefore enabled to support the GPRS and/or EDGE operating standard as well as supporting the voice servicing portions the GSM standard. In particular, the wireless terminals 116, 118, 120, 122, 124, 126, 128, and 130 support the pipelined processing of received RF bursts in slots of a GSM frame so that a plurality of slots in each sub-frame of a GSM frame are allocated for forward link transmissions to a single wireless terminal. In one particular embodiment, a number of slots of a GSM frame are allocated for forward link transmissions to a wireless terminal such that the wireless terminal must receive and process a number of RF bursts, e.g., 2, 3, 4, or more RF bursts, in each sub-frame of the GSM frame. The wireless terminal is able to process the RF bursts contained in these slots and still service reverse link transmissions and the other processing requirements of the wireless terminal.

Figure 2:
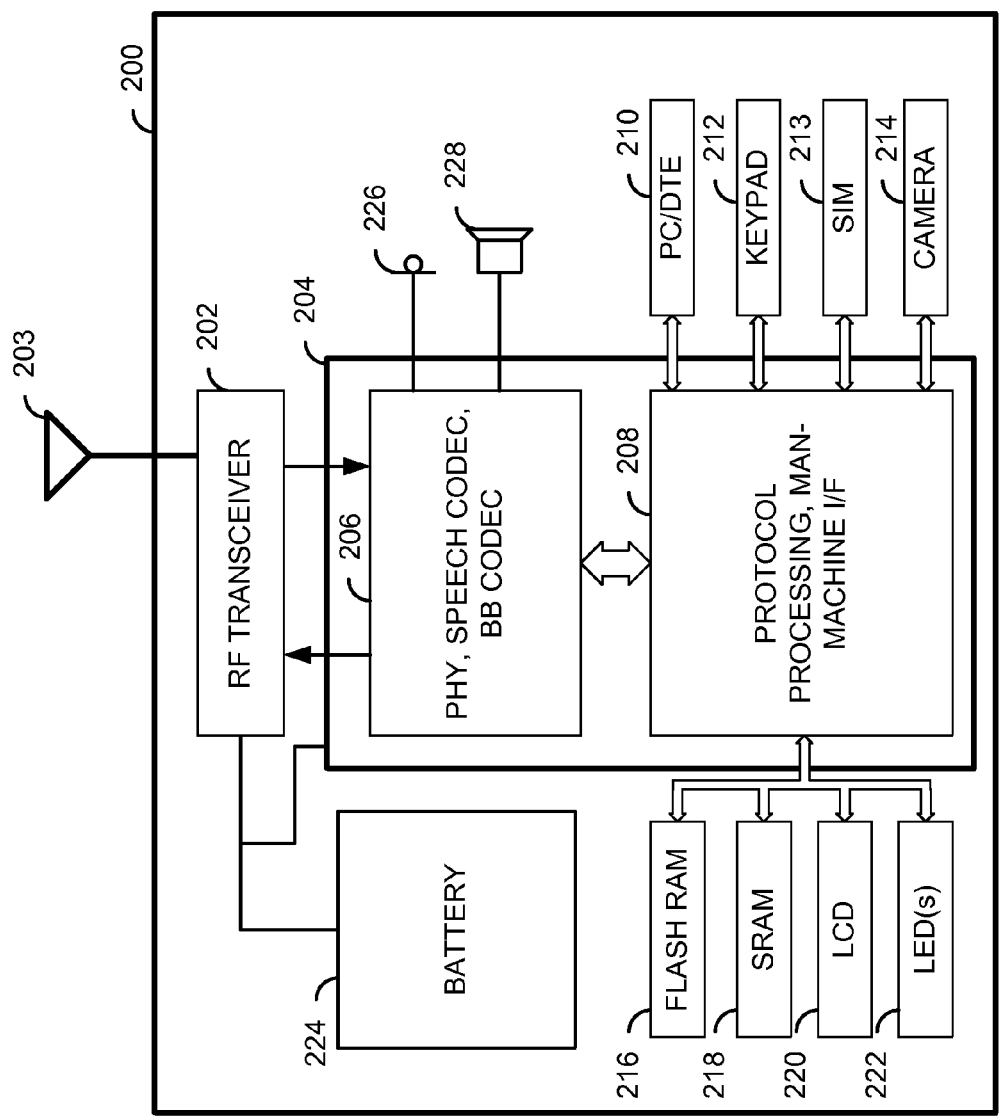
FIG. 2 is a block diagram functionally illustrating a wireless terminal constructed according to the present invention.

FIG. 2 is a block diagram functionally illustrating a wireless terminal 200 constructed according to the present invention. The wireless terminal 200 of FIG. 2 includes an RF transceiver 202, digital processing components 204, and various other components contained within a housing. The digital processing components 204 includes two main functional components, a physical layer processing, speech COder/DECoder (CODEC), and baseband CODEC functional block 206 and a protocol processing, man-machine interface functional block 208. A Digital Signal Processor (DSP) is the major component of the physical layer processing, speech COder/DECoder (CODEC), and baseband CODEC functional block 206 while a microprocessor, e.g., Reduced Instruction Set Computing (RISC) processor, is the major component of the protocol processing, man-machine interface functional block 208. The DSP may also be referred to as a Radio Interface Processor (RIP) while the RISC processor may be referred to as a system processor. However, these naming conventions are not to be taken as limiting the functions of these components.

The RF transceiver 202 couples to an antenna 203, to the digital processing components 204, and also to a battery 224 that powers all components of the wireless terminal 200. The physical layer processing, speech COder/DECoder (CODEC), and baseband CODEC functional block 206 couples to the protocol processing, man-machine interface functional block 208 and to a coupled microphone 226 and speaker 228. The protocol processing, man-machine interface functional block 208 couples to a Personal Computing/Data Terminal Equipment interface 210, a keypad 212, a Subscriber Identification Module (SIM) port 213, a camera 214, a flash RAM 216, an SRAM 218, a LCD 220, and LED(s) 222. The camera 214 and LCD 220 may support either/both still pictures and moving pictures. Thus, the wireless terminal 200 of FIG. 2 supports video services as well as audio services via the cellular network.

Figure 3:
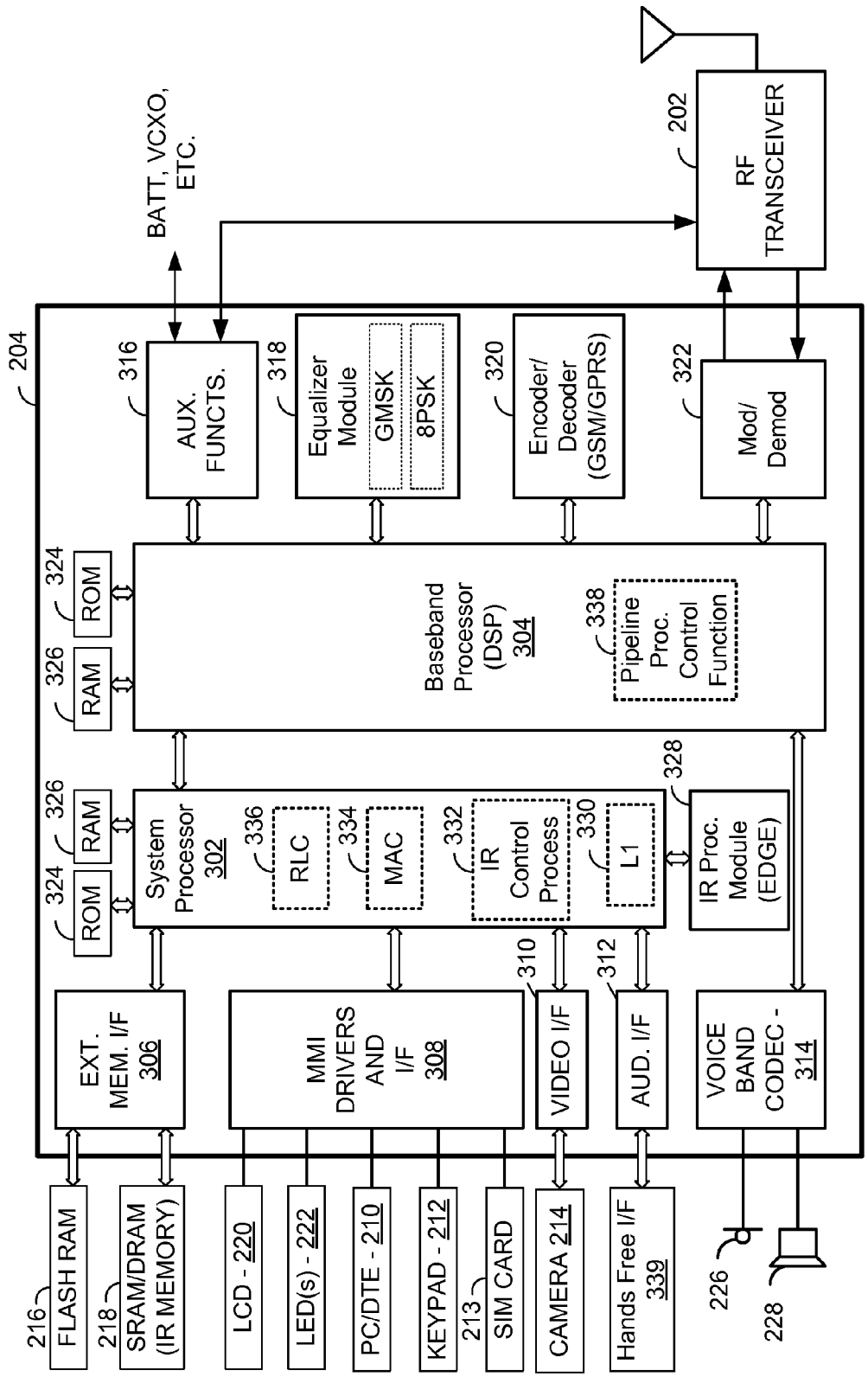
FIG. 3 is a block diagram illustrating in more detail the wireless terminal of FIG. 2, with particular emphasis on the digital processing components of the wireless terminal.

FIG. 3 is a block diagram illustrating in more detail the wireless terminal of FIG. 2, with particular emphasis on the digital processing components of the wireless terminal. The digital processing components 204 include a system processor 302, a baseband processor 304, and a plurality of supporting components. The supporting components include an external memory interface 306, MMI drivers and I/F 308, a video I/F 310, an audio I/F 312 that couples to a Hands Free I/F 339, a voice band CODEC 314, auxiliary functions 316, a modulator/demodulator 322, ROM 324, RAM 326 and a plurality of processing modules. In some embodiments, the modulator/demodulator 322 is not a separate structural component with these functions being performed internal to the baseband processor 304.

The processing modules are also referred to herein as accelerators, co-processors, processing modules, or otherwise, and include auxiliary functions 316, an equalizer module 318, an encoder/decoder module 320, and an Incremental Redundancy (IR) processing module 328. The interconnections of FIG. 3 are one example of a manner in which these components may be interconnected. Other embodiments support additional/alternate couplings. Such coupling may be direct, indirect, and/or may be via one or more intermediary components.

RAM and ROM service both the system processor 302 and the baseband processor 304. Both the system processor 302 and the baseband processor 304 may couple to shared RAM 326 and ROM 324, couple to separate RAM, coupled to separate ROM, couple to multiple RAM blocks, some shared, some not shared, or may be served in a differing manner by the memory. In one particular embodiment, the system processor 302 and the baseband processor 304 coupled to respective separate RAMs and ROMs and also couple to a shared RAM that services control and data transfers between the devices. The processing modules 316, 318, 320, 322, and 328 may coupled as illustrated in FIG. 3 but may also coupled in other manners in differing embodiments.

The system processor 302 services at least a portion of a serviced protocol stack, e.g., GSM/GPRS/EDGE protocol stack. In particular the system processor 302 services Layer 1 (L1) operations 330, a portion of Incremental Redundancy (IR) GSM protocol stack operations 332 (referred to as "IR control process"), Medium Access Control (MAC) operations 334, and Radio Link Control (RLC) operations 336. The baseband processor 304 in combination with the modulator/demodulator 322, RF transceiver, equalizer module 318, and/or encoder/decoder module 320 service the Physical Layer (PHY) operations performed by the digital processing components 204.

Still referring to FIG. 3, the baseband processor 304 implements a pipeline processing control function 338 that controls the interaction of the baseband processor 304 and equalizer module 318. As will be described further with reference to FIGS. 5-8, the pipeline processing control function 338 implemented by the baseband processor 304 is responsible for causing the equalizer module 318 and baseband processor 304 to pipeline process received RF bursts that reside within slots of a GSM frame. In the particular embodiment of FIGS. 2 and 3, with the single RF front end 202, the wireless terminal 200 may receive and process RF bursts in up to four slots of each sub-frame of a GSM frame, i.e., be assigned four slots for forward link transmissions in any particular GSM frame. In another embodiment in which the wireless terminal 200 includes more than one RF front end, the wireless terminal 200 may be assigned more than four slots in each sub-frame of the GSM frame. In this case, required transmit operations would be performed using a second RF front end while a first RF front end would perform the receive operations. When the forward link transmissions and the reverse link transmissions occupy different channels with sufficient frequency separation, and the wireless terminal otherwise supports full duplex operations, the wireless terminal could receive and transmit at the same time.

Figure 4:
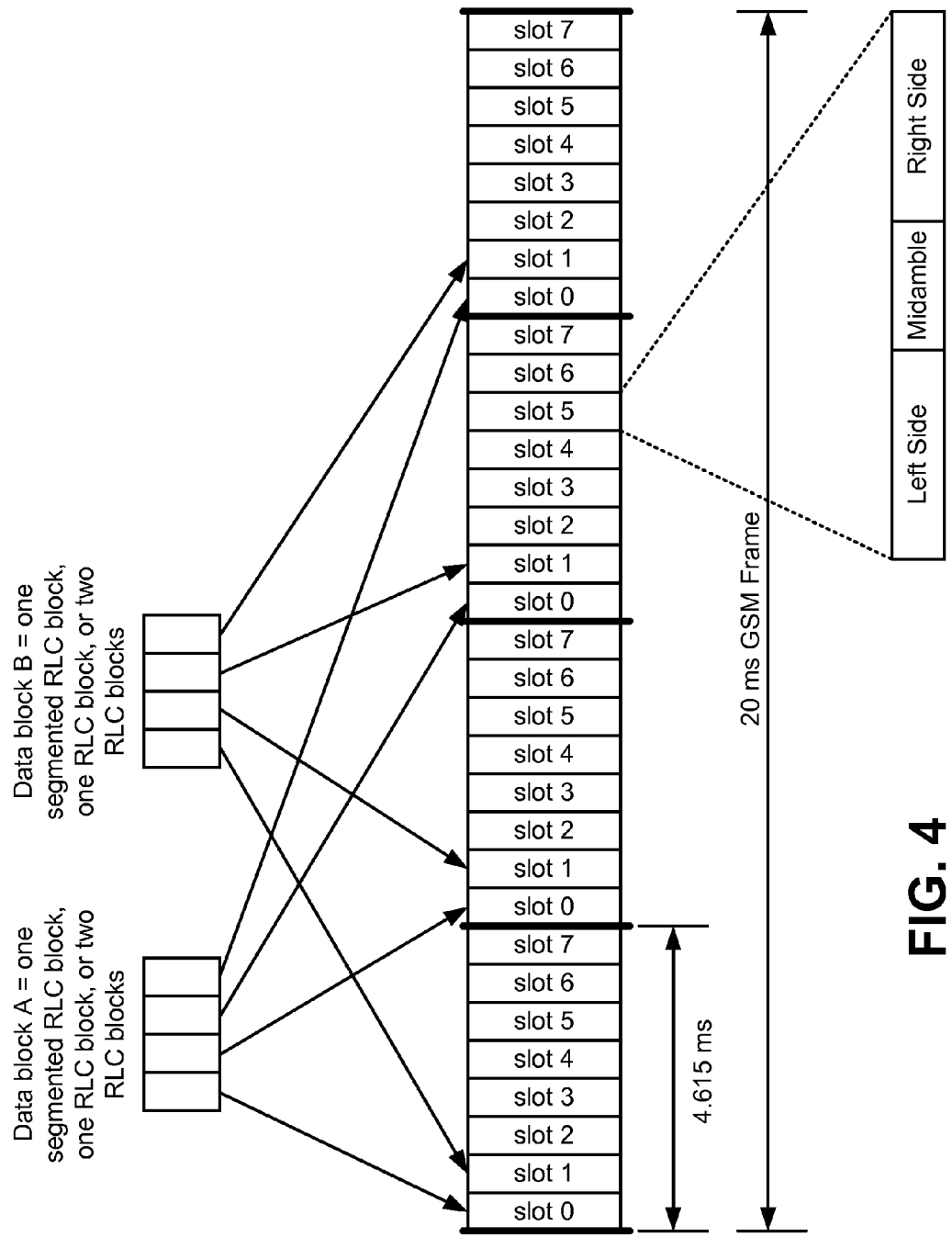
FIG. 4 is a block diagram illustrating the general structure of a GSM frame and the manner in which data blocks are carried by the GSM frame.

FIG. 4 is a block diagram illustrating the general structure of a GSM frame and the manner in which data blocks are carried by the GSM frame. The GSM frame is 20 ms in duration, including guard periods, is divided into four sub-frames, and includes eight slots, slots 0 through 7, in each sub-frame. Each slot is approximately 577 μs in duration, includes a left side, a midamble, and a right side. The left side and right side of an RF burst of the time slot carry data while the midamble is a training sequence.

The RF bursts of four time slots of the GSM frame carry a segmented RLC block, a complete RLC block, or two RLC blocks, depending upon a supported Modulation and Coding Scheme (MCS) mode. For example, data block A is carried in slot 0 of sub-frame 1, slot 0 of sub-frame 2, slot 0 of sub-frame 3, and slot 0 of sub-frame 3. Data block A may carry a segmented RLC block, an RLC block, or two RLC blocks. Likewise, data block B is carried in slot 1 of sub-frame 1, slot 1 of sub-frame 2, slot 1 of sub-frame 3, and slot 1 of sub-frame 3. The MCS mode of each set of slots, i.e., slot n of each sub-frame, for the GSM frame is consistent for the GSM frame. Further, the MCS mode of differing sets of slots of the GSM frame, e.g., slot 0 of each sub-frame vs. any of slots 1-7 of each sub-frame, may differ. As will be described further with reference to FIG. 5, the wireless terminal 200 may be assigned multiple slots for forward link transmissions that must be received and processed by the wireless terminal 200.

Figure 5:
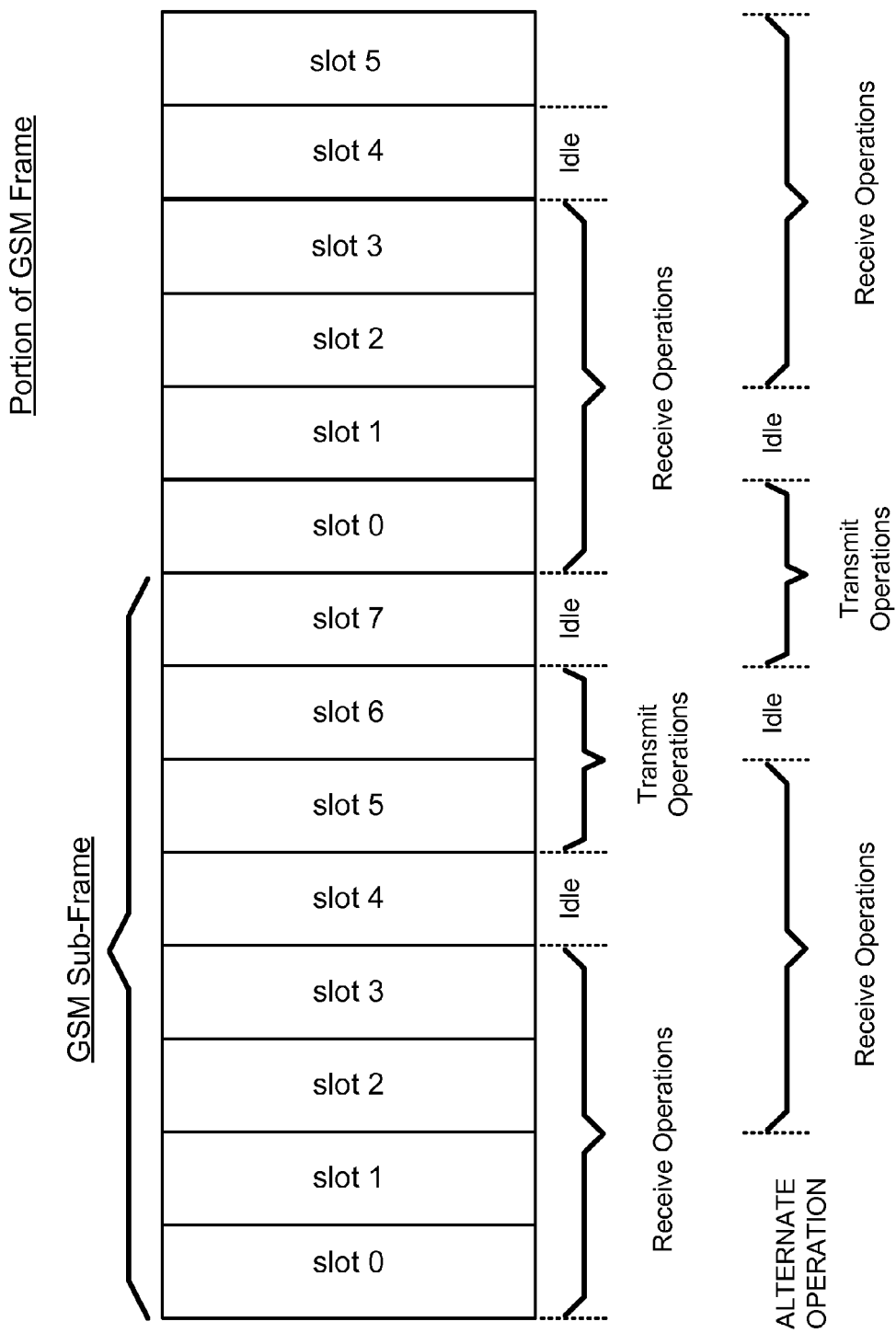
FIG. 5 is a block diagram illustrating the manner in which a wireless terminal may be allocated a plurality of slots in a GSM frame.

FIG. 5 is a block diagram illustrating the manner in which a wireless terminal 200 may be allocated a plurality of slots in a GSM frame. Shown in FIG. 5 is a portion of the GSM frame previously fully illustrated in FIG. 4. In the embodiment of FIG. 5, the wireless terminal 200 is allocated slots 0-3 of each GSM sub-frame for forward link transmissions. Thus, the wireless terminal 200 performs receive operations for each of slots 0-3 of each GSM sub-frame. Complimentary to the receive operation are transmit operations in slots 5-6 of each GSM sub-frame. Because of the construct of a typical wireless terminal, e.g., wireless terminal 200 of FIG. 2, a single RF front end 202 services both receive operations and transmit operations but can operate only in one of a receive mode and a transmit mode at any time. Thus, the wireless terminal 200 must quickly switch from the receive mode to the transmit mode to service reverse link communications. In the example of FIG. 5, the wireless terminal 200 transitions during slot 4 from receive operations for slots 0-3 to transmit operations for slots 5-6, and transitions during slot 7 back to receive operations for slots 0-3 of the next sub-frame. A wireless terminal having multiple RF front ends may service both receive operations and transmit operations concurrently on differing channels and, absent prohibitive interference, the wireless terminal could be assigned all eight slots for forward link transmissions. When concurrent transmit and receive operations are prohibited, the multiple RF front ends would allow the wireless terminal to transmit and receive in adjacent frames, without requiring the intervening idle slot.

With the pipeline processing capabilities of the wireless terminal 200 of the present invention, the wireless terminal 200 is capable of receiving and processing forward link transmissions in slots 0-3. As will be described further with reference to FIGS. 6A-8, the baseband processor 304 and the equalizer module 318 execute pipeline processing operations on received RF bursts. These operations may be easily applied to any number of RF bursts contained in a corresponding number of assigned slots.

While FIG. 5 shows an allocation of slots 0-3 for receive operations and slots 5-6 for transmit operations, such an allocation is not required by the present invention. With one alternate operation shown, receive operations are performed for slots 2-5 of each GSM sub-frame while transmit operations are performed for slot 7 and slot 0 of each sub-frame. In the embodiment, slots 1 and 6 are used for switching between transmit and receive operations. Further, the allocated forward link slots and/or allocated reverse link slots need not be adjacent one another. For example, the wireless terminal could be assigned forward link transmissions in slots 1, 2, and 4 and reverse link operations in slot 6. Moreover, for a wireless terminal having two RF front ends, the idle slots illustrated in FIG. 5 would not be required and such slots could be allocated for forward link transmissions (or reverse link transmissions). As the reader will appreciate, many differing allocations may be made without departing from the scope of the present invention.

Figure 6A:
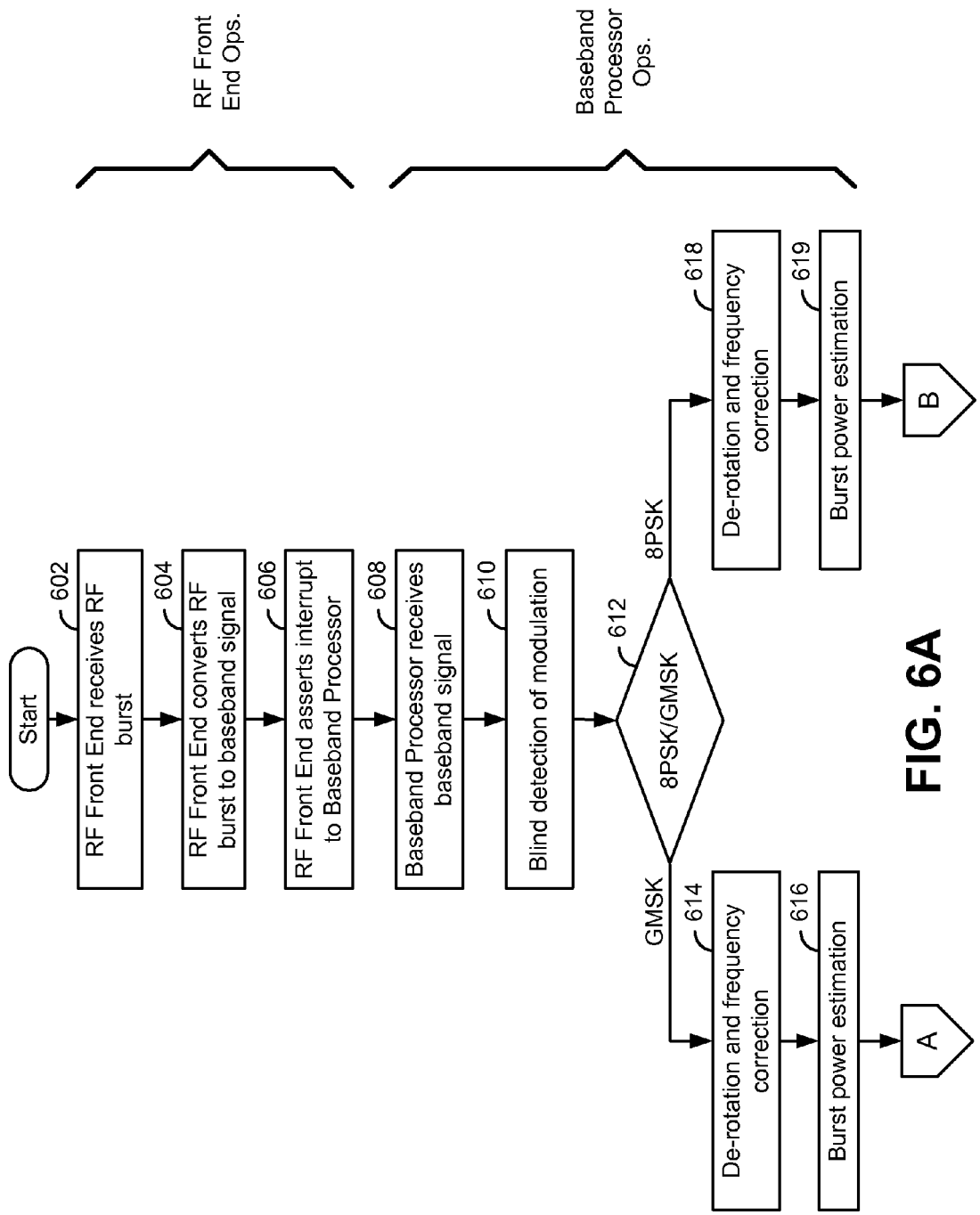
Figure 6B:
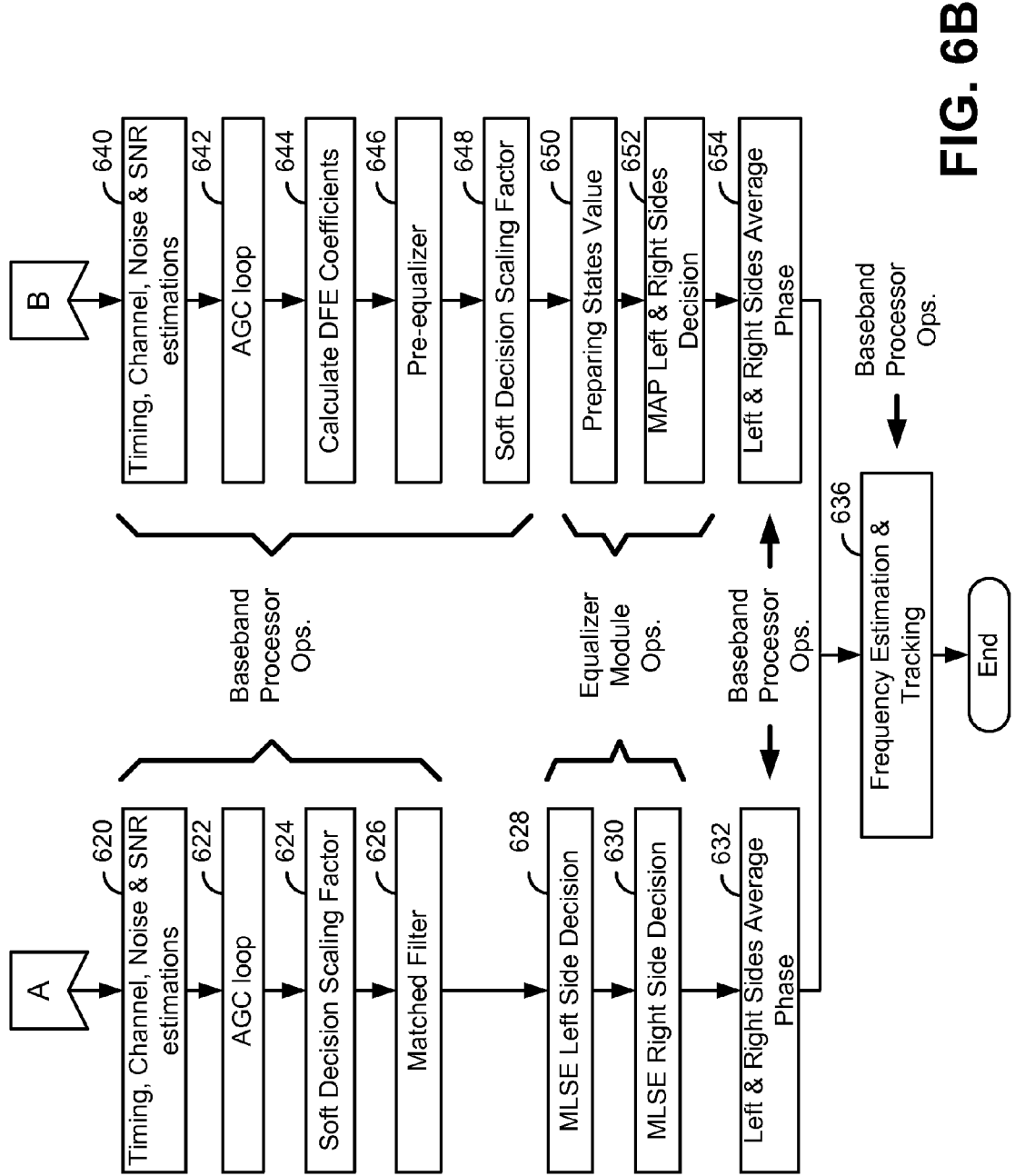

FIGS. 6A and 6B are flow charts illustrating operation of a wireless terminal 200 in receiving and processing a RF burst. The operations illustrated in FIG. 6A to 6B correspond to a single RF burst in a corresponding slot of GSM frame. At least the RF front end 202, the baseband processor 304, and the equalizer module 318 illustrated in FIG. 3 perform these operations. These operations are generally called out as being performed by one of these components. However, the split of processing duties among these various components may differ without departing from the scope of the present invention.

Referring particular to FIG. 6A, operation commences with the RF front end 202 receiving an RF burst in a corresponding slot of a GSM frame (step 602). The RF front end 202 then converts the RF burst to a baseband signal (step 604). Upon completion of the conversion, the RF front end 202 sends an interrupt to the baseband processor 304 (step 606). Thus, as referred to in FIG. 6A, steps 602-606 are performed by the RF front end 202.

Operation continues with the baseband processor 304 receiving the baseband signal (step 608). In a typical operation, either the RF front end 202, the baseband processor 304, or modulator/demodulator 322 will sample the analog baseband signal to digitize the baseband signal. After receipt of the baseband signal (in a digitized format), the baseband processor 304 performs blind detection of a modulation format of the baseband signal (step 610). This blind detection of the modulation format determines the modulation format of the corresponding baseband signal. In one particular embodiment according to the GSM standard, the modulation format will be either Gaussian Minimum Shift Keying (GMSK) modulation or Eight Phase Shift Keying (8PSK) modulation. The baseband processor 304 makes the determination (step 612) and proceeds along one of two branches based upon the detected modulation format.

For GMSK modulation, the baseband processor 304 performs de-rotation and frequency correction of the baseband signal (step 614). Next, the baseband processor 304 performs burst power estimation of the baseband signal (step 616). Referring now to FIG. 6B via off page connector A, the baseband processor 304 next performs timing, channel, noise, and signal-to-noise ratio (SNR) estimation (step 620). Subsequently, the baseband processor 304 performs automatic gain control (AGC) loop calculations (step 622). Next, the baseband processor 304 performs soft decision scaling factor determination on the baseband signal (step 624). After step 624, the baseband processor 304 performs matched filtering operations on the baseband signal (step 626).

Steps 608-626 are referred to hereinafter as pre-equalization processing operations. With the baseband processor 304 performing these pre-equalization processing operations on the baseband signal it produces a processed baseband signal. Upon completion of these pre-equalization processing operations, the baseband processor 304 issues a command to the equalizer module 318.

The equalizer module 318, upon receiving the command, prepares to equalize the processed baseband signal based upon the modulation format, e.g., GMSK modulation or 8PSK modulation. The equalizer module 318 receives the processed baseband signal, settings, and/or parameters from the baseband processor 304 and performs Maximum Likelihood Sequence Estimation (MLSE) equalization on the left side of the baseband signal (step 628). As was shown previously with reference to FIG. 4, each RF burst contains a left side of data, a midamble, and a right side of data. At step 628, the equalizer module 318 equalizes the left side of the RF burst to produce soft decisions for the left side. Then, the equalizer module 318 equalizes the right side of the processed baseband signal (step 630). The equalization of the right side produces a plurality of soft decisions corresponding to the right side.

The equalizer module 318 then issues an interrupt to the baseband processor 304 indicating that the equalizer operations are complete for the RF burst. The baseband processor 304 then receives the soft decisions from the equalizer module 318. Next, the baseband processor 304 determines an average phase of the left and right sides based upon the soft decisions received from the equalizer module 318 (step 632). The baseband processor 304 then performs frequency estimation and tracking based upon the soft decisions received from the equalizer module 318 (step 636). The operations of step 632 (or step 654) and step 636 are referred to herein as "post-equalization processing." After operation at step 636, processing of the particular RF burst is completed.

Referring again to FIG. 6A, the baseband processor 304 and equalizer module 318 take the right branch from step 612 when an 8PSK modulation is blindly detected at step 610. In the first operation for 8PSK modulation, the baseband processor 304 performs de-rotation and frequency correction on the baseband signal (step 618). The baseband processor 304 then performs burst power estimation of the baseband signal (step 619). Referring now to FIG. 6B via off page connector B, operation continues with the baseband processor 304 performing timing, channel, noise, and SNR estimations (step 640). The baseband processor 304 then performs AGC loop calculations on the baseband signal (step 642). Next, the baseband processor 304 calculates Decision Feedback Equalizer (DFE) coefficients that will be used by the equalizer module 318 (step 644). The baseband processor 304 then performs pre-equalizer operations on the baseband signal (step 646). Finally, the baseband processor 304 determines soft decision scaling factors for the baseband signal (step 648). Steps 6 18-648 performed by the baseband processor 304 are referred to herein as "pre-equalization processing" operations for an 8PSK modulation baseband signal. Upon completion of step 648, the baseband processor 304 issues a command to equalizer module 318 to equalize the processed baseband signal.

Upon receipt of the command from the baseband processor 304, the equalizer module 318 receives the processed baseband signal, settings, and/or parameters from the baseband processor 304 and commences equalization of the processed baseband signal. The equalizer module 318 first prepares state values that it will use in equalizing the 8PSK modulated processed baseband signal (step 650). In the illustrated embodiment the equalizer module 318 uses a Maximum A posteriori Probability (MAP) equalizer. The equalizer module 318 then equalizes the left and right sides of the processed baseband signal using the MAP equalizer to produce soft decisions for the processed baseband signal (step 652). Upon completion of step 654, the equalizer module 318 issues an interrupt to the baseband processor 304 indicating its completion of equalizing the processed baseband signal corresponding.

The baseband processor 304 then receives the soft decisions from the equalizer module 318. Next, the baseband processor 304 determines the average phase of the left and right sides of the processed baseband signal based upon the soft decisions (step 654). Finally, the baseband processor 304 performs frequency estimation and tracking for the soft decisions (step 636). The operations of steps 654 and 636 are referred to as post-equalization processing operations. From step 636, operation is complete for the particular RF burst.

FIG. 7 is a flow chart illustrating operations of the baseband processor 302 according to an embodiment of the present invention. Operation commences wherein the baseband processor is either idle or performing operations not specified in FIG. 7 (step 702). The baseband processor 304 receives an Rx interrupt from the RF front end 202 for an RF burst contained in a corresponding time slot (step 704). When the baseband processor is ready (step 706), it receives a baseband signal corresponding to the RF burst from the RF front end 202 (step 708). The baseband processor 304 receives a digitized signal from the RF front end 202 or intermediary component such as the modulator/demodulator 322 shown in FIG. 3.

The baseband processor 304 then performs pre-equalization processing on the baseband signal (step 710). The pre-equalization processing performed by the baseband processor 304 was described in detail with reference to FIGS. 6A and 6B. Such pre-equalization processing differs for the different modulation formats supported by the wireless terminal 200. The baseband processor 304 then determines equalizer settings/parameters that will be employed by the equalizer module 318 (step 712). Then, the baseband processor 304 sends a command to the equalizer module 318 directing the equalizer module 318 to equalize the processed baseband signal (step 714). With the equalizer module 318 responding to the command, the baseband processor 304 passes the processed baseband signal, the parameters, and the settings that were determined at step 712 to the equalizer module 318 (step 716).

Steps 704-716 describe the pre-equalization processing operations performed by the baseband processor 304 on a particular RF burst. As will be further described with reference to FIG. 8, the baseband processor 304 performs pre-equalization processing on the baseband signal and passes the processed baseband signal (and equalizer settings/parameters in some embodiments) to the equalizer module 318. While the equalizer module 318 is equalizing the processed baseband signal for a corresponding RF burst, the baseband processor 304 performs pre-equalization processing on a baseband signal corresponding to a subsequent RF burst. After the equalizer module 318 has completed its equalization of the baseband signal to produce soft decisions, the baseband processor 304 performs post-equalization processing on the soft decisions returned by the equalizer module 318.

The post-equalization operations of the baseband processor 304 commence with the baseband processor 304 receiving an interrupt from the equalizer module 318 (step 718). Upon receipt of the interrupt from the equalizer module 318, the baseband processor 304 may not be able to immediately service the interrupt because of its performing pre-equalization processing operations on a baseband signal corresponding to a subsequent RF burst. When the baseband processor 304 is ready to process (step 720), the baseband processor 304 receives the soft decisions from the equalizer module 318 (step 722). Then, the baseband processor 304 performs post-equalization processing on the soft decisions received from the equalizer module 318 (step 724). With the post-equalization operations on the plurality of soft decisions completed, the baseband processor stores the plurality of soft decisions for subsequent use (step 726).

After the processing a complete GSM frame, 4 sets of soft decisions corresponding to a data block, e.g., segmented RLC data block, RLC block, or multiple RLC blocks, the baseband processor 304 is ready for subsequent processing. When this determination is made at step 728, the baseband processor 304 retrieves the post-equalization processed soft decisions for the data block (step 730). Four sets of processed soft decisions correspond to either a segmented RLC block, a complete RLC block, or two RLC blocks. The baseband processor 304 then passes the data block soft decisions to the encoder/decoder module 320 or to the system processor 302 depending upon the type of data block. For example, encoder/decoder module 320 performs decoding operations on GSM voice data blocks and GPRS data blocks while IR processing module 328 performs encoding/decoding operations on EDGE data blocks. From steps 716, 726 and 732 operation returns to step 702.

FIG. 8 is a block diagram illustrating pipeline processing operations performed according to the present invention. Particularly, FIG. 8 is intended to illustrate how a wireless terminal receives and processes multiple RF bursts in a pipelined fashion. With the example of FIG. 8, slots 0-3 service forward link transmissions for the wireless terminal 200. In a first operation, the RF front end 202 receives an RF burst in slot 0 and issues an interrupt to the baseband processor 304 after reception is complete. Upon receipt of the interrupt, the baseband processor 304 receives the baseband signal corresponding to the RF burst of slot 0 from the RF front end 202 and performs pre-equalization processing of the baseband signal. Resultantly, the baseband processor 304 produces a processed baseband signal and upon completion issues a baseband processor command to the equalizer module 318 that corresponds to slot 0 RF burst.

The equalizer module 318 receives the processed baseband signal from the baseband processor 304. The equalizer module 318 then equalizes the processed baseband signal corresponding to slot 0 and, upon completion, issues an equalizer module interrupt to the baseband processor 304. As is shown in FIG. 8, with time progressing from left to right, when the equalizer module 318 completes its processing of the baseband signal corresponding to slot 0, the RF front end 202 has already issued an interrupt to the baseband processor 304, the baseband processor 304 has already received the baseband signal, and the baseband processor 304 is already performing pre-equalization processing on the baseband signal corresponding to slot 1. Thus, while the equalizer module 318 is equalizing the processed baseband signal corresponding to slot 0, the baseband processor 304 is performing pre-equalization processing on the baseband signal corresponding to slot 1. The pipeline processing supported by the components of the wireless terminal 200 allows it to receive and process RF bursts in adjacent slots.

Once the baseband processor 304 has completed its pre-equalization processing on the baseband signal corresponding to slot 1, it issues a command to the equalizer module 318 for the processed baseband signal corresponding to slot 1. Then, the baseband processor 304 services the interrupt received from the equalizer module 318 corresponding to slot 0 by receiving the soft decisions corresponding to slot 0, and by performing post-equalization processing on the plurality of soft decisions corresponding to slot 0.

Pipeline processing operations continue for slots 1 and 2 and partially for slot 3 as are illustrated in FIG. 8. However, upon completion of equalization of the processed baseband signal corresponding to slot 3 by the equalizer module 318, the baseband processor 304 may be idle and be awaiting the interrupt from the equalizer module 318. Once the equalizer module 318 issues an interrupt to the baseband processor 304, the baseband processor receives the soft decisions from the equalizer module 318 and performs post-equalization processing on the plurality of soft decisions corresponding to slot 3. The operations of FIG. 8 may be applied to fewer or more than four slots per sub-frame, a maximum number of slots supportable depending upon the supporting capabilities of the wireless terminal, e.g., multiple RF front ends, etc.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

The invention claimed is:

1. A method for processing baseband signals corresponding to N slots of a Radio Frequency (RF) time divided frame by an RF receiver, the method comprising:
    for a first slot of the N slots:
        pre-equalization processing a first slot baseband signal; and
        equalizing the first slot baseband signal after pre-equalization processing the first slot baseband signal;
    for each of a second through $N^{th}$ slots:
        pre-equalization processing a current slot baseband signal while equalizing a prior slot baseband signal;
        equalizing the current slot baseband signal; and
        post-equalization processing the prior slot baseband signal while equalizing the current slot baseband signal; and
    post-equalization processing an $N^{th}$ slot baseband signal.

2. The method of claim 1, further comprising:
    determining a modulation of the first slot baseband signal; and
    equalizing the first slot baseband signal based upon a determined modulation.

3. The method of claim 2, wherein equalizing the first slot baseband signal comprises:
    Maximum Likelihood Sequence Estimation (MLSE) equalizing the first slot baseband signal when the determined modulation is Gaussian Minimum Shift Keying (GMSK); and
    Maximum A posteriori Probability (MAP) equalizing the first slot baseband signal when the determined modulation is Eight Phase Shift Keying (8PSK).

4. The method of claim 1, wherein pre-equalization processing includes at least one of:
    de-rotation and frequency correction;
    burst power estimation;
    timing, channel, noise, and Signal-to-Noise Ratio estimation;
    Automatic Gain Control loop processing;
    soft decision scaling factor processing; and
    matched filter processing.

5. The method of claim 1, wherein pre-equalization processing includes at least one of:
    equalizer coefficient calculation; and
    soft decision scaling factor processing.

6. The method of claim 1, wherein post-equalization processing includes at least one of:
    phase averaging of a plurality of soft decisions; and
    frequency estimation and tracking.

7. A method for processing baseband signals corresponding to N slots of a Radio Frequency (RF) time divided frame by an RF receiver having a baseband processor and an equalizer module, the method comprising:
    for a first slot of the N slots:
        pre-equalization processing a first slot baseband signal by the baseband processor; and
        equalizing the first slot baseband signal after pre-equalization processing the first slot baseband signal by the equalizer module;

for each of a second through $N^{th}$ slot:
pre-equalization processing a current slot baseband signal by the baseband processor while equalizing a prior slot baseband signal by the equalizer module;
equalizing the current slot baseband signal by the equalizer module; and
post-equalization processing the prior slot baseband signal while equalizing the current slot baseband signal by the baseband processor; and
post-equalization processing an $N^{th}$ slot baseband signal by the baseband processor.

8. The method of claim 7, further comprising:
determining a modulation of the first slot baseband signal; and
equalizing the first slot baseband signal based upon a determined modulation.

9. The method of claim 8, wherein equalizing the first slot baseband signal comprises:
Maximum Likelihood Sequence Estimation (MLSE) equalizing the first slot baseband signal when the determined modulation is Gaussian Minimum Shift Keying (GMSK); and
Maximum A posteriori Probability (MAP) equalizing the first slot baseband signal when the determined modulation is Eight Phase Shift Keying (8PSK).

10. The method of claim 7, wherein pre-equalization processing includes at least one of:
de-rotation and frequency correction;
burst power estimation;
timing, channel, noise, and Signal-to-Noise Ratio estimation;
Automatic Gain Control loop processing;
soft decision scaling factor processing; and
matched filter processing.

11. The method of claim 7, wherein pre-equalization processing includes at least one of:
equalizer coefficient calculation; and
soft decision scaling factor processing.

12. The method of claim 7, wherein post-equalization processing includes at least one of:
phase averaging of a plurality of soft decisions; and
frequency estimation and tracking.

13. A method for processing baseband signals corresponding to N slots of a Radio Frequency (RF) time divided frame by an RF receiver, the method comprising:
for a first slot of the N slots, pre-equalization processing a first slot baseband signal without concurrently equalizing the first slot baseband signal;
for a plurality of the N slots, pre-equalization processing an N slot baseband signal while concurrently equalizing an N-1 slot baseband signal; and
for a plurality of the N slots, post-equalization processing the N-1 slot baseband signal while concurrently equalizing the N slot baseband signal.

14. The method of claim 13, further comprising:
determining a modulation of the first slot baseband signal; and
equalizing the first slot baseband signal based upon a determined modulation.

15. The method of claim 14, wherein equalizing the first slot baseband signal comprises:
Maximum Likelihood Sequence Estimation (MLSE) equalizing the first slot baseband signal when a determined modulation is Gaussian Minimum Shift Keying (GMSK); and
Maximum A posteriori Probability (MAP) equalizing the first slot baseband signal when the determined modulation is Eight Phase Shift Keying (8PSK).

16. The method of claim 13, wherein pre-equalization processing includes at least one of:
de-rotation and frequency correction;
burst power estimation;
timing, channel, noise, and Signal-to-Noise Ratio estimation;
Automatic Gain Control loop processing;
soft decision scaling factor processing; and
matched filter processing.

17. The method of claim 13, wherein pre-equalization processing includes at least one of:
equalizer coefficient calculation; and
soft decision scaling factor processing.

18. The method of claim 13, wherein post-equalization processing includes at least one of:
phase averaging of a plurality of soft decisions; and
frequency estimation and tracking.

19. The method of claim 13, wherein:
pre-equalization processing is performed by a baseband processor;
post-equalization processing is performed by the baseband processor; and
equalization processing is performed by an equalizer module.

20. A method for processing a multi-slot Time Division Multiple Access (TDMA) signal by an RF receiver, wherein the TDMA signal is received over a plurality of time periods as a first section followed by a second section followed by a third section, the method comprising:
pre-processing the third section;
equalizing the second section; and
post-processing the first section;
wherein the equalizing occurs during the same or substantially the same time period as the pre-processing and/or the post-processing.

21. The method of claim 20, wherein pre-processing comprises determining a modulation type.

22. The method of claim 21, wherein the modulation type is one of Gaussian Minimum Shift Keying (GMSK) and Light Phase Shift Keying (8PSK).

23. The method of claim 21, wherein equalizing is one of Maximum Likelihood Sequence Estimation (MLSL) equalizing and Maximum A posteriori Probability (MAP) equalizing.

24. The method of claim 20, wherein pre-processing comprises one or more of:
de-rotation and frequency correction;
burst power estimation;
timing estimation;
channel estimation;
equalizer coefficient calculation;
automatic gain control loop processing;
soft decision scaling factor processing; and
matched filter processing.

25. The method of claim 20, wherein post-processing comprises one or more of:
phase averaging of a plurality of soft decisions;
frequency estimation; and
frequency tracking.

26. The method of claim 20, wherein:
pre-processing is performed by a baseband processor;
post-processing is performed by the baseband processor; and
equalizing is performed by an equalizer module.

27. A system for processing a multi-slot Time Division Multiple Access (TDMA) signal, wherein the TDMA signal is received over a plurality of time periods as a first section followed by a second section followed by a third section, the system comprising:
- a baseband processor for pre-processing the third section and post-processing the first section; and
- an equalizer module for equalizing the second section;
- wherein the equalizing occurs during the same or substantially the same time period as the pre-processing and/or the post-processing.

28. The system of claim 27, wherein pre-processing comprises determining a modulation type.

29. The system of claim 28, wherein the modulation type is one of Gaussian Minimum Shift Keying (GMSK) and Light Phase Shift Keying (8PSK).

30. The system of claim 28, wherein the equalizer module comprises a Maximum Likelihood Sequence Estimation (MLSE) equalizer and a Maximum A posteriori Probability (MAP) equalizer.

31. The system of claim 27, wherein pre-processing comprises one or more of:
- de-rotation and frequency correction;
- burst power estimation;
- timing estimation;
- channel estimation;
- equalizer coefficient calculation;
- automatic gain control loop processing;
- soft decision scaling factor processing; and
- matched filter processing.

32. The system of claim 27, wherein post-processing comprises one or more of:
- phase averaging of a plurality of soft decisions;
- frequency estimation; and
- frequency tracking.

* * * * *

UNITED STATES PATENT AND TRADEMARK OFFICE
CERTIFICATE OF CORRECTION

PATENT NO. : 7,542,523 B2  Page 1 of 1
APPLICATION NO. : 11/265021
DATED : June 2, 2009
INVENTOR(S) : Baoguo Yang et al.

It is certified that error appears in the above-identified patent and that said Letters Patent is hereby corrected as shown below:

Column 14, line 42, in Claim 22: replace "Light" with --Eight--.

Column 14, line 45, in Claim 23: replace "(MLSL)" with --(MLSE)--.

Column 15, line 15, in Claim 29: replace "Light" with --Eight--.

Signed and Sealed this

Twenty-eighth Day of July, 2009

JOHN DOLL
*Acting Director of the United States Patent and Trademark Office*